United States Patent
Ueda et al.

(10) Patent No.: US 10,883,594 B2
(45) Date of Patent: Jan. 5, 2021

(54) WORM REDUCER

(71) Applicant: JTEKT CORPORATION, Osaka (JP)

(72) Inventors: Hirofumi Ueda, Shiki-gun (JP);
Naofumi Kawamura, Kishiwada (JP)

(73) Assignee: JTEKT CORPORATION, Osaka (JP)

( * ) Notice: Subject to any disclaimer, the term of this patent is extended or adjusted under 35 U.S.C. 154(b) by 230 days.

(21) Appl. No.: 16/046,155

(22) Filed: Jul. 26, 2018

(65) Prior Publication Data

US 2019/0040945 A1 Feb. 7, 2019

(30) Foreign Application Priority Data

Aug. 7, 2017 (JP) .................. 2017-152345

(51) Int. Cl.
| | |
|---|---|
| *F16H 1/16* | (2006.01) |
| *F16H 57/022* | (2012.01) |
| *F16H 57/04* | (2010.01) |
| *F16H 57/12* | (2006.01) |

(Continued)

(52) U.S. Cl.
CPC .............. *F16H 57/12* (2013.01); *F16H 1/16* (2013.01); *F16H 57/022* (2013.01); *F16H 57/039* (2013.01); *F16H 57/0464* (2013.01); *F16H 57/0498* (2013.01); *B62D 5/0403* (2013.01); *B62D 5/0409* (2013.01);

(Continued)

(58) Field of Classification Search
CPC .......... F16H 57/12; F16H 1/16; F16H 57/022; F16H 57/039; F16H 2057/0213; F16H 2057/0222; F16H 2057/126; F16H 2057/127; F16H 57/0464; F16H 57/0498;

(Continued)

(56) References Cited

U.S. PATENT DOCUMENTS 1,940,110 A 12/1933 Watts et al.
9,033,096 B2 * 5/2015 Yoshikawa .......... B62D 5/0409
180/444

(Continued)

FOREIGN PATENT DOCUMENTS

EP 1 225 116 A2 7/2002
EP 3 088 277 A1 11/2016

(Continued)

OTHER PUBLICATIONS

Nov. 19, 2018 Extended Search Report issued in European Patent Application No. 18186260.8.

*Primary Examiner* — Victor L MacArthur
*Assistant Examiner* — Gregory Robert Weber
(74) *Attorney, Agent, or Firm* — Oliff PLC

(57) ABSTRACT

An urging member urges a first end of a worm shaft toward a worm wheel via a first bearing. The worm shaft includes a tooth flank forming portion and a non-tooth flank forming portion formed between the first end and the tooth flank forming portion. In a housing, a shaft housing portion that houses the worm shaft includes a substantially straight portion and a reduced diameter portion. The substantially straight portion has a substantially constant bore diameter, and extends in an axial direction of the worm shaft. The reduced diameter portion is arranged on the first end side with respect to the substantially straight portion, and has a bore diameter reduced from a position that overlaps tooth flanks in the axial direction to a position that overlaps the non-tooth flank forming portion in the axial direction.

5 Claims, 4 Drawing Sheets

(51) Int. Cl.
*F16H 57/039* (2012.01)
*B62D 5/04* (2006.01)
*F16H 57/021* (2012.01)

(52) U.S. Cl.
CPC ............... *F16H 2057/0213* (2013.01); *F16H 2057/0222* (2013.01); *F16H 2057/126* (2013.01); *F16H 2057/127* (2013.01)

(58) Field of Classification Search
CPC ... B62D 5/0403; B62D 5/0409; B62D 5/0454
See application file for complete search history.

(56) References Cited

U.S. PATENT DOCUMENTS

| | | | | |
|---|---|---|---|---|
| 9,505,433 | B2* | 11/2016 | Kimoto | B62D 5/0424 |
| 9,902,421 | B2* | 2/2018 | Kawamura | F16H 1/16 |
| 10,059,366 | B2* | 8/2018 | Segawa | F16C 19/26 |
| 10,183,693 | B2* | 1/2019 | Segawa | F16C 23/08 |
| 10,288,126 | B2* | 5/2019 | Segawa | F16D 3/54 |
| 2014/0008142 | A1 | 1/2014 | Yoshikawa et al. | |
| 2017/0362530 | A1* | 12/2017 | Hirooka | F16H 57/12 |
| 2018/0259059 | A1 | 9/2018 | Nakamura et al. | |
| 2019/0234505 | A1* | 8/2019 | Ishii | F16H 1/16 |
| 2019/0337554 | A1* | 11/2019 | Park | B62D 5/0409 |

FOREIGN PATENT DOCUMENTS

| | | |
|---|---|---|
| JP | 2012-197029 A | 10/2012 |
| JP | 2015-157610 A | 9/2015 |
| WO | 2016/076250 A1 | 5/2016 |

\* cited by examiner

WORM REDUCER

INCORPORATION BY REFERENCE

The disclosure of Japanese Patent Application No. 2017-152345 filed on Aug. 7, 2017 including the specification, drawings and abstract, is incorporated herein by reference in its entirety.

BACKGROUND OF THE INVENTION

1. Field of the Invention

The present invention relates to a worm reducer.

2. Description of the Related Art

Worm reducers are used in electric power steering systems in order to transmit rotational power output from electric motors to steering shafts. In order to reduce a backlash between a worm shaft having one end coupled to an electric motor in a drivable manner and a worm wheel coupled to a steering shaft, there is known a worm reducer having a structure in which an urging member urges the other end of the worm shaft toward the worm wheel via a bearing (see, for example, Japanese Patent Application Publication No. 2012-197029 (JP 2012-197029 A)).

In general, grease serving as a lubricant fills an internal space of a housing that houses the worm shaft and the worm wheel. An electric power steering system of Japanese Patent Application Publication No. 2015-157610 (JP 2015-157610 A) is proposed in order to suppress a decrease in the amount of grease adhering to a meshing portion between the worm shaft and the worm wheel. Specifically, in JP 2015-157610 A, grease return grooves each having a triangular shape in cross section are provided on a pair of inner walls of the housing that face each other in an axial direction of the worm wheel. The grease return groove extends in a direction orthogonal to both an axial direction of the worm shaft and the axial direction of the worm wheel. The grease return grooves are arranged in an area that overlaps the meshing portion as viewed in the axial direction of the worm wheel. During a steering operation, the grease adhering to the meshing portion is forced out in a tooth trace direction of the worm wheel, and is forced into the grease return groove. The grease forced into the grease return groove is guided along the inclined inner face of the grease return groove, and is forced out toward the worm shaft and the worm wheel. Then, the grease adheres to the worm shaft, and returns to the meshing portion.

In JP 2012-197029 A, when the worm shaft is shifted in the urging direction, an abutment portion between a coil spring that constitutes the urging member and the bearing is rubbed. The rubbing may cause troubles such as generation of wear particles or generation of abnormal noise due to rubbing noise.

In JP 2012-197029 A, when the worm shaft is rotated inside the housing, a tooth flank forming portion of the worm shaft where helical teeth are formed functions to send the lubricant along the axial direction of the worm shaft depending on the rotational direction of the worm shaft.

In the worm shaft, a portion where the tooth flanks are not formed (non-tooth flank forming portion) is present between the other end where the bearing is arranged and the tooth flank forming portion. The non-tooth flank forming portion does not have the function of sending the lubricant. Therefore, it is difficult to supply the lubricant sent by the tooth flank forming portion toward the bearing. It is also difficult to supply the lubricant to the abutment portion between the urging member and the bearing. Thus, the lubricant sent by the tooth flank forming portion is not greatly expected to exert the effect of reducing the occurrence of troubles due to the rubbing of the abutment portion.

In JP 2015-157610 A, the grease return grooves for returning the grease to the meshing portion face the tooth flank forming portion of the worm shaft, but do not face the non-tooth flank forming portion of the worm shaft. Therefore, the grease return grooves are not greatly expected to exert the function of supplying the grease of the meshing portion toward the non-tooth flank forming portion of the worm shaft and furthermore toward the bearing.

SUMMARY OF THE INVENTION

It is one object of the present invention to provide a worm reducer capable of reducing the occurrence of troubles due to rubbing of an abutment portion between an urging member and a bearing.

A worm reducer according to one aspect of the present invention has the following features in its structure. That is, the worm reducer includes a worm shaft, a worm wheel, a housing, a bearing, an urging member, and a lubricant. The worm wheel meshes with the worm shaft. The housing includes a tubular shaft housing portion and a wheel housing portion. The shaft housing portion houses the worm shaft. The wheel housing portion houses the worm wheel. The bearing rotatably supports one end of the worm shaft. The urging member abuts against an outer peripheral surface of the bearing, and urges the worm shaft toward the worm wheel via the bearing. The lubricant is housed in an internal space of the housing. The worm shaft includes a tooth flank forming portion and a non-tooth flank forming portion. A tooth flank is formed in the tooth flank forming portion. The non-tooth flank forming portion is formed between the one end and the tooth flank forming portion. The shaft housing portion includes a substantially straight portion and a reduced diameter portion. The substantially straight portion has a substantially constant bore diameter, and extends in an axial direction of the worm shaft. The reduced diameter portion is arranged on the one end side with respect to the substantially straight portion, and has a bore diameter reduced from a position that overlaps the tooth flank in the axial direction of the worm shaft to a position that overlaps the non-tooth flank forming portion in the axial direction of the worm shaft.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
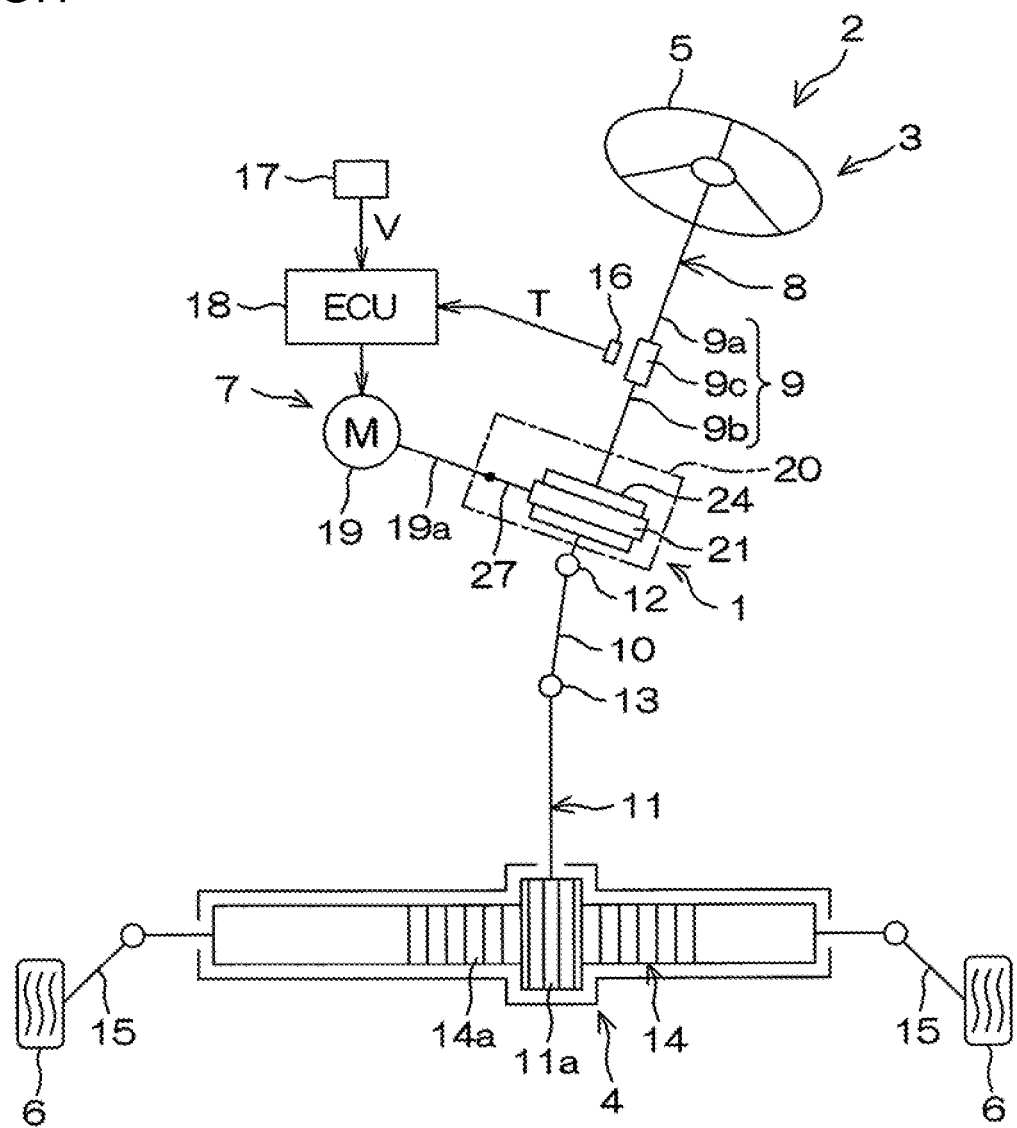
FIG. 1 is a schematic diagram illustrating the overall structure of an electric power steering system 2 to which a worm reducer according to a first embodiment of the present invention is applied.

Embodiments of the present invention are described below with reference to the accompanying drawings. FIG. 1 is a schematic diagram illustrating the overall structure of an electric power steering system 2 to which a worm reducer 1 according to a first embodiment of the present invention is applied. Referring to FIG. 1, the electric power steering system 2 includes a steering mechanism 3 and a steering operation mechanism 4. The electric power steering system 2 turns steered wheels 6 based on a driver's operation for a steering wheel (steering member) 5. The steering mechanism 3 includes an assist mechanism 7 configured to assist the driver's operation for the steering wheel 5.

The steering mechanism 3 includes a steering shaft 8 configured to rotate in association with rotation of the steering wheel 5. The steering shaft 8 includes a column shaft 9, an intermediate shaft 10, and a pinion shaft 11. The column shaft 9 includes an input shaft 9a, an output shaft 9b, and a torsion bar 9c. The input shaft 9a is coupled to the steering wheel 5. The output shaft 9b is coupled to the intermediate shaft 10. The torsion bar 9c coaxially couples the input shaft 9a and the output shaft 9b to each other.

The output shaft 9b is coupled to the intermediate shaft 10 via a universal joint 12. The intermediate shaft 10 is coupled to the pinion shaft 11 via a universal joint 13. A pinion 11a is formed on the pinion shaft 11. The steering operation mechanism 4 includes a rack shaft 14 and tie rods 15. A rack 14a is formed on the rack shaft 14. The rack 14a meshes with the pinion 11a. Each tie rod 15 has one end coupled to the rack shaft 14, and the other end coupled to the steered wheel 6.

When the steering wheel 5 is rotated in response to the driver's operation for the steering wheel 5, the pinion shaft 11 is rotated via the column shaft 9 and the intermediate shaft 10. The rotation of the pinion shaft 11 is converted into axial reciprocating motion of the rack shaft 14 by a rack and pinion mechanism. The reciprocating motion of the rack shaft 14 changes the steered angles of the steered wheels 6.

The assist mechanism 7 includes a torque sensor 16, a vehicle speed sensor 17, an electronic control unit (ECU) 18, an electric motor 19, and the worm reducer 1. The torque sensor 16 detects a steering torque T based on a torsion amount between the input shaft 9a and the output shaft 9b. The ECU 18 determines an assist torque based on the steering torque T detected by the torque sensor 16 and a vehicle speed V detected by the vehicle speed sensor 17. Driving of the electric motor 19 is controlled by the ECU 18. A rotational force (power) of the electric motor 19 is transmitted to the output shaft 9b of the column shaft 9 of the steering shaft 8 via the worm reducer 1. As a result, the assist torque is applied to the output shaft 9b, thereby assisting the driver's steering operation.

Figure 2:
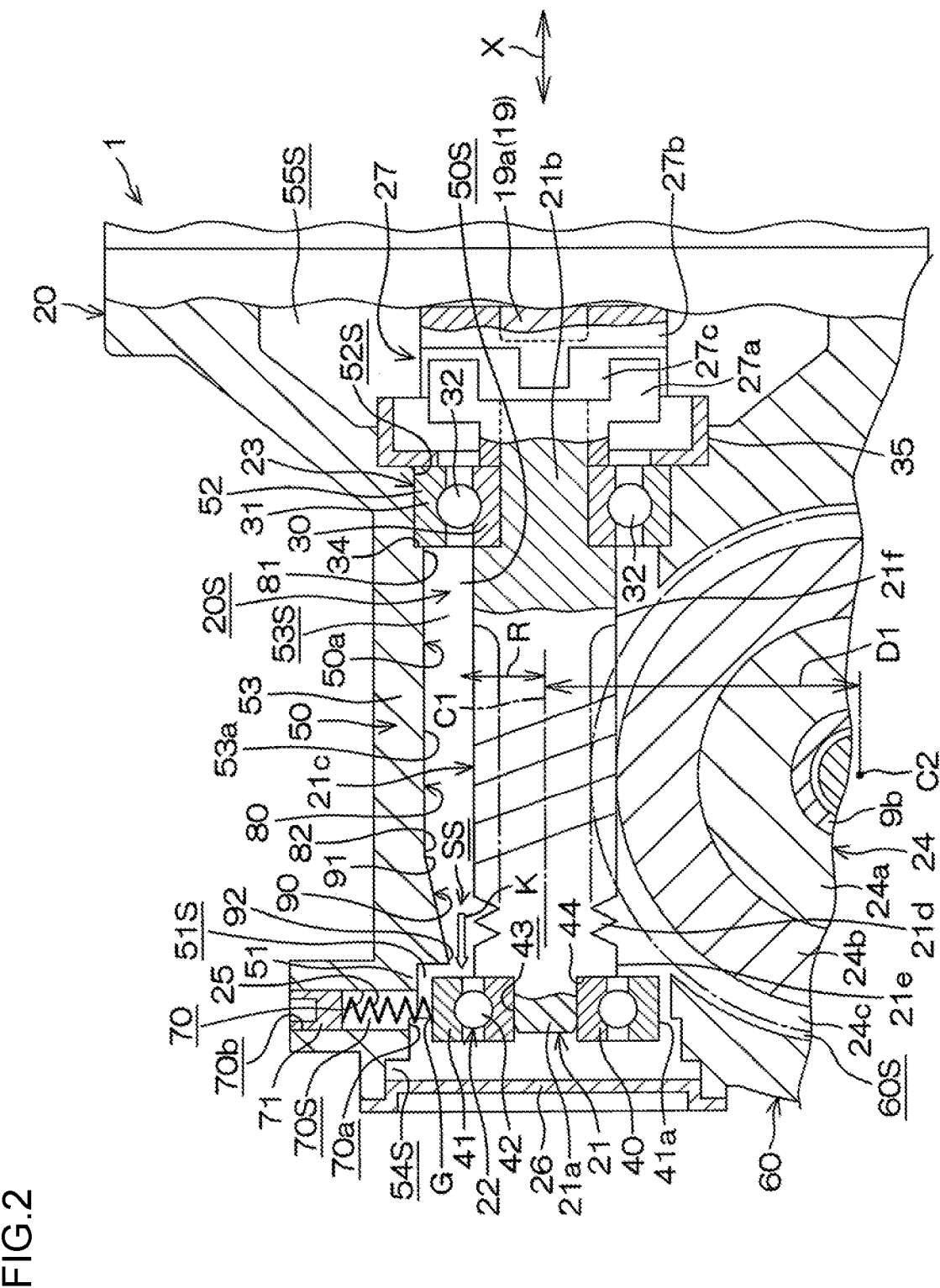
FIG. 2 is a schematic sectional view of the worm reducer of the first embodiment.

Next, the structure of the worm reducer 1 is described. FIG. 2 is a sectional view of a main part of the worm reducer 1. Referring to FIG. 2, the worm reducer 1 includes a housing 20, a worm shaft 21, a first bearing 22, a second bearing 23, a worm wheel 24, an urging member 25, and a lid member 26. The housing 20 includes a tubular shaft housing portion 50 and a wheel housing portion 60. The shaft housing portion 50 houses the worm shaft 21. The wheel housing portion 60 houses the worm wheel 24.

The worm shaft 21 includes a first end 21a in an axial direction X, a second end 21b in the axial direction X, and an intermediate part 21c. The intermediate part 21c is arranged between the first end 21a and the second end 21b. The intermediate part 21c includes a tooth flank forming portion 21d, a non-tooth flank forming portion 21e, and a non-tooth flank forming portion 21f. Teeth are formed on the tooth flank forming portion 21d. The non-tooth flank forming portion 21e is arranged between the first end 21a and the tooth flank forming portion 21d, and teeth are not formed on the non-tooth flank forming portion 21e. The non-tooth flank forming portion 21f is arranged between the second end 21b and the tooth flank forming portion 21d, and teeth are not formed on the non-tooth flank forming portion 21f.

The first end 21a is an axial end of the worm shaft 21 that is located opposite to the electric motor 19 side. The second end 21b is an axial end of the worm shaft 21 that is located on the electric motor 19 side. The worm wheel 24 is coupled to the output shaft 9b of the column shaft 9 so as to be rotatable together with the output shaft 9b. The worm wheel 24 includes an annular metal core 24a and an annular resin member 24b. The metal core 24a is coupled to the output shaft 9b so as to be rotatable together with the output shaft 9b. The resin member 24b is externally fitted to the metal core 24a. A tooth flank forming portion 24c is provided on the outer peripheral surface of the resin member 24b. Teeth of the tooth flank forming portion 24c of the worm wheel 24 mesh with the teeth of the tooth flank forming portion 21d of the worm shaft 21.

The worm shaft 21 is arranged substantially coaxially with an output shaft 19a of the electric motor 19. The second end 21b of the worm shaft 21 and the end of the output shaft 19a of the electric motor 19 are coupled to each other via a power transmission joint 27 in a torque transmissible and pivotable manner. The power transmission joint 27 includes a first rotation element 27a, a second rotation element 27b, and an intermediate element 27c. The first rotation element 27a is coupled to the second end 21b of the worm shaft 21 so as to be rotatable together with the worm shaft 21. The second rotation element 27b is coupled to the output shaft 19a of the electric motor 19 so as to be rotatable together with the output shaft 19a. The intermediate element 27c is interposed between the first rotation element 27a and the second rotation element 27b, and transmits a torque between the rotation elements 27a and 27b. The intermediate element 27c is formed of an elastic body such as rubber.

The first bearing 22 is attached to the first end 21a of the worm shaft 21. The first end 21a of the worm shaft 21 is rotatably supported on the shaft housing portion 50 of the housing 20 via the first bearing 22. The second bearing 23 is attached to the second end 21b of the worm shaft 21. The second end 21b of the worm shaft 21 is rotatably supported on the shaft housing portion 50 of the housing 20 via the second bearing 23. The intermediate element 27c of the power transmission joint 27 is elastically deformed to allow the worm shaft 21 to pivot about a bearing center of the second bearing 23 relative to the output shaft 19a of the electric motor 19.

For example, the first bearing 22 is a ball bearing. The first bearing 22 includes an inner ring 40, an outer ring 41, and a plurality of rolling elements 42. The inner ring 40 of the first bearing 22 is fitted to a fitting recess 43 provided on the outer periphery of the first end 21a of the worm shaft 21. Therefore, the inner ring 40 is rotatable together with the worm shaft 21. The inner ring 40 abuts against a positioning stepped portion 44 in the axial direction X. The positioning stepped portion 44 is provided on the outer periphery of the first end 21a of the worm shaft 21. Thus, axial movement of the inner ring 40 relative to the worm shaft 21 is restricted.

For example, the second bearing 23 is a ball bearing. The second bearing 23 includes an inner ring 30, an outer ring 31, and a plurality of rolling elements 32. The inner ring 30 of the second bearing 23 is fitted to the second end 21b of the worm shaft 21 by tight fit so as to be rotatable together with the worm shaft 21. The outer ring 31 is held between a positioning stepped portion 34 and a clamping member 35 in the axial direction X. The positioning stepped portion 34 is provided on an inner peripheral surface 50a of the shaft housing portion 50 of the housing 20. The clamping member 35 is threadedly fitted to a thread portion provided on the inner peripheral surface 50a of the shaft housing portion 50 of the housing 20. Thus, axial movement of the outer ring 31 is restricted.

For example, the urging member 25 is a compression coil spring formed of a metal. The urging member 25 elastically urges the first end 21a of the worm shaft 21 toward the worm wheel 24 via the first bearing 22. The housing 20 houses the worm shaft 21, the first bearing 22, the second bearing 23, the worm wheel 24, the urging member 25, the lid member 26, the power transmission joint 27, and the like. For example, the housing 20 is an aluminum alloy casting.

The shaft housing portion 50 of the housing 20 includes a first bearing housing portion 51, a second bearing housing portion 52, and an intermediate part housing portion 53. The first bearing housing portion 51 houses the first end 21a of the worm shaft 21 and the first bearing 22. The second bearing housing portion 52 houses the second end 21b of the worm shaft 21 and the second bearing 23. The intermediate part housing portion 53 houses the intermediate part 21c of the worm shaft 21. An internal space 20S of the housing 20 includes a shaft housing space 50S and a wheel housing space 60S. The shaft housing space 50S is an internal space of the shaft housing portion 50. The wheel housing space 60S is an internal space of the wheel housing portion 60. The shaft housing space 50S includes a first bearing housing space 51S, a second bearing housing space 52S, an intermediate part housing space 53S, a first opening 54S, and a second opening 55S. The first bearing housing space 51S is defined by the first bearing housing portion 51. The second bearing housing space 52S is defined by the second bearing housing portion 52. The intermediate part housing space 53S is defined by the intermediate part housing portion 53.

The intermediate part housing space 53S is interposed between the first bearing housing space 51S and the second bearing housing space 52S. The intermediate part housing space 53S communicates with the wheel housing space 60S. At the communicating part, the teeth of the tooth flank forming portion 21d of the worm shaft 21 mesh with the teeth of the tooth flank forming portion 24c of the worm wheel 24. The internal space 20S of the housing 20 houses a lubricant such as grease. The lubricant is arranged in the meshing area between the worm shaft 21 and the worm wheel 24.

The first opening 54S is formed at one end of the housing 20 in the axial direction X. The first opening 54S communicates the first bearing housing space 51S with the outside of the internal space 20S of the housing 20. The lid member 26 is fitted to the first opening 54S, and closes the first opening 54S. The first bearing housing space 51S functions as a bearing movement hole in which the first bearing 22 moves in a direction in which a core-to-core distance D1 between the worm shaft 21 and the worm wheel 24 increases or decreases. The core-to-core distance D1 is a distance between a central axis C1 of the worm shaft 21 and a central axis C2 of the worm wheel 24. The bearing movement hole is formed as an elongated hole that is long in the direction in which the core-to-core distance D1 increases or decreases.

An urging member housing hole 70 is formed in the first bearing housing portion 51. The urging member housing hole 70 is arranged opposite to the worm wheel 24 side across the first bearing 22. The urging member housing hole 70 houses the urging member 25. An urging member housing space 70S communicates with the first bearing housing space 51S. The urging member housing space 70S is an internal space of the urging member housing hole 70. Specifically, an inner opening 70a and an outer opening 70b are formed in the urging member housing hole 70. The inner opening 70a is open to the first bearing housing space 51S. The outer opening 70b is open to the outside of the internal space 20S. The outer opening 70b is closed by a closing member 71. The urging member 25 is interposed between the closing member 71 and an outer peripheral surface 41a of the outer ring 41 of the first bearing 22, and abuts against the closing member 71 and the outer peripheral surface 41a of the outer ring 41. The urging member 25 elastically urges the first end 21a of the worm shaft 21 toward the worm wheel 24 via the first bearing 22.

In the shaft housing portion 50, the intermediate part housing portion 53 that defines the intermediate part housing space 53S includes a substantially straight portion 80 and a tapered reduced diameter portion 90 on an inner peripheral surface 53a of the intermediate part housing portion 53 (corresponding to a part of the inner peripheral surface 50a of the shaft housing portion 50). The reduced diameter portion 90 is arranged on the first end 21a side with respect to the substantially straight portion 80. The substantially straight portion 80 has a substantially constant bore diameter, and extends substantially straight in the axial direction X of the worm shaft 21 from the second bearing housing portion 52 toward the first bearing housing portion 51.

The substantially straight portion 80 includes one end 81 adjacent to the second bearing housing portion 52, and the other end 82 connected to the reduced diameter portion 90. Since the housing 20 is a casting, the substantially straight portion 80 has a draft angle at which the substantially straight portion 80 is inclined so that the one end 81 has a diameter larger than that of the other end 82. For example, the draft angle is 3 degrees as shown in JIS B 0403: 1995 (ISO 8062: 1994), Section 9.2 "Table 3: General tolerances for draft angles of aluminum alloy castings".

The reduced diameter portion 90 has a reduced diameter so as to be tapered from the substantially straight portion 80 toward the first bearing housing portion 51. The bore diameter of the reduced diameter portion 90 is reduced from a position that overlaps the tooth flanks of the tooth flank forming portion 21d in the axial direction X of the worm shaft 21 to a position that overlaps the non-tooth flank forming portion 21e in the axial direction X of the worm shaft 21. That is, the reduced diameter portion 90 includes one end 91 connected to the other end 82 of the substantially straight portion 80, and the other end 92 adjacent to the first bearing housing portion 51. The one end 91 of the reduced diameter portion 90 is arranged on an outer side in a radial direction R with respect to the tooth flank forming portion 21d of the worm shaft 21. The other end 92 of the reduced diameter portion 90 is arranged on an outer side in the radial direction R with respect to the non-tooth flank forming portion 21e of the worm shaft 21.

The bore diameter of the reduced diameter portion 90 is smaller than the bore diameter of the substantially straight portion 80. The gradient of the tapered reduced diameter portion 90 (gradient of inclination with respect to the axial direction X) is larger than the draft angle set in the substantially straight portion 80. The second bearing housing portion 52 houses the second end 21b and the second bearing 23 attached to the second end 21b. The second opening 55S is formed at the other end of the housing 20 in the axial direction X. The second bearing housing space 52S defined by the second bearing housing portion 52 communicates with the outside of the internal space 20S of the housing 20 via the second opening 55S.

The second end 21b of the worm shaft 21 extends to the second opening 55S through the second bearing housing space 52S. In the second opening 55S, the second end 21b is coupled to the output shaft 19a of the electric motor 19 via the power transmission joint 27. According to this embodiment, as illustrated in FIG. 2, the shaft housing portion 50 includes the reduced diameter portion 90 having a bore diameter reduced from the position that overlaps the tooth flanks of the tooth flank forming portion 21d in the axial direction X of the worm shaft 21 to the position that overlaps the non-tooth flank forming portion 21e in the axial direction X of the worm shaft 21. Therefore, the sectional area of a clearance space SS in the radial direction R between the reduced diameter portion 90 of the shaft housing portion 50 and the worm shaft 21 is reduced from the position that overlaps the tooth flanks of the tooth flank forming portion 21d in the axial direction of the worm shaft 21 to the position that overlaps the non-tooth flank forming portion 21e in the axial direction of the worm shaft 21. Thus, when the worm shaft 21 is rotated in a predetermined direction, the lubricant is sent to a part of the clearance space SS that is located on an inner side of the reduced diameter portion 90 and on an outer side of the non-tooth flank forming portion 21e (see an outline arrow K) at a high sending pressure and at a high sending rate. Further, the lubricant is supplied to an abutment portion G between the urging member 25 and the outer peripheral surface of the first bearing 22 (outer peripheral surface 41a of the outer ring 41). Thus, the occurrence of wear and the generation of rubbing noise are reduced at the abutment portion G.

Figure 3:
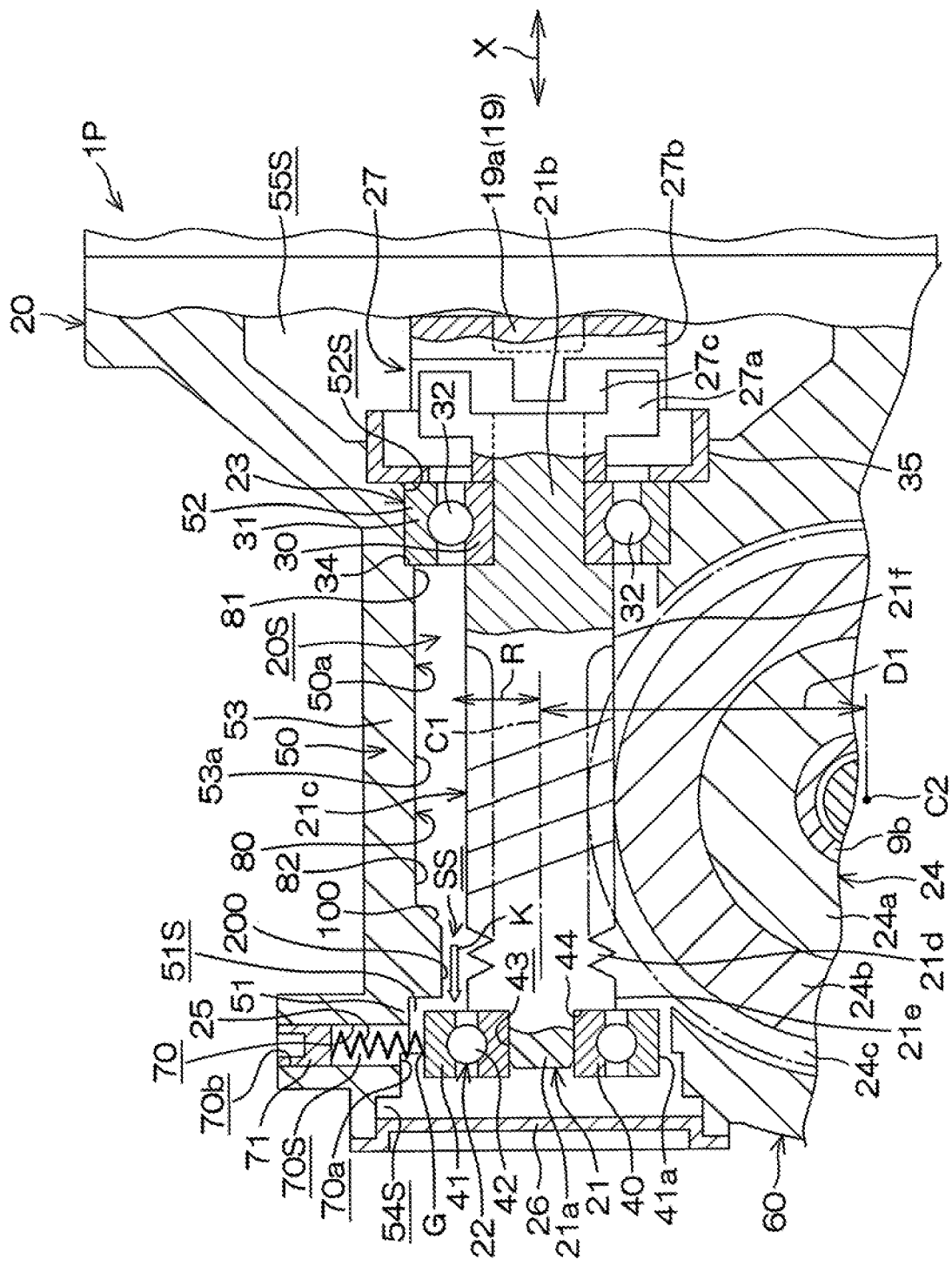
FIG. 3 is a schematic sectional view of a worm reducer according to a second embodiment of the present invention.

Since the reduced diameter portion 90 has a tapered shape, the lubricant can smoothly be supplied toward the abutment portion G. Further, the bore diameter of the reduced diameter portion 90 is smaller than the bore diameter of the substantially straight portion 80, whereby the sending pressure of the lubricant can substantially be increased. When the lubricant is supplied under pressure by using a jig (not illustrated) or the like to fill the internal space 20S of the housing 20 during assembling work for the worm reducer 1, there is an advantage in that the lubricant is easily supplied to the abutment portion G owing to the action of the reduced diameter portion 90. FIG. 3 is a schematic sectional view of a worm reducer 1P according to a second embodiment of the present invention. The worm reducer 1P of the second embodiment in FIG. 3 is different from the worm reducer 1 of the first embodiment in FIG. 2 in that the worm reducer 1P includes a tapered first reduced diameter portion 100 and an substantially straight second reduced diameter portion 200. The first reduced diameter portion 100 has a diameter continuously reduced toward the first bearing housing portion 51 as a reduced diameter portion having a diameter reduced relative to the substantially straight portion 80. The second reduced diameter portion 200 is arranged on the first end 21a side with respect to the first reduced diameter portion 100. The gradient of the tapered first reduced diameter portion 100 (gradient of inclination with respect to the axial direction X) is larger than the draft angle set in the substantially straight portion 80 (for example, 3 degrees).

The first reduced diameter portion 100 is arranged adjacently to the other end 82 of the substantially straight portion 80. The second reduced diameter portion 200 is interposed between the first reduced diameter portion 100 and the first bearing housing portion 51. The entire first reduced diameter portion 100 and a part of the second reduced diameter portion 200 are arranged on the outer side in the radial direction R with respect to the tooth flank forming portion 21d of the worm shaft 21. The remaining part of the second reduced diameter portion 200 is arranged on the outer side in the radial direction R with respect to the non-tooth flank forming portion 21e of the worm shaft 21.

In this embodiment, when the worm shaft 21 is rotated in a predetermined direction, the lubricant is sent to a part of the clearance space SS that is located on an inner side of both the reduced diameter portions 100 and 200 and on the outer side in the radial direction R with respect to the non-tooth flank forming portion 21e of the worm shaft 21 (see the outline arrow K) at a high sending pressure and at a high sending rate owing to the actions of both the reduced diameter portions 100 and 200. Therefore, the lubricant is supplied to the abutment portion G between the urging member 25 and the outer peripheral surface of the first bearing 22 (outer peripheral surface 41a of the outer ring 41) as in the first embodiment. Thus, the occurrence of wear and the generation of rubbing noise are reduced at the abutment portion G.

Figure 4:
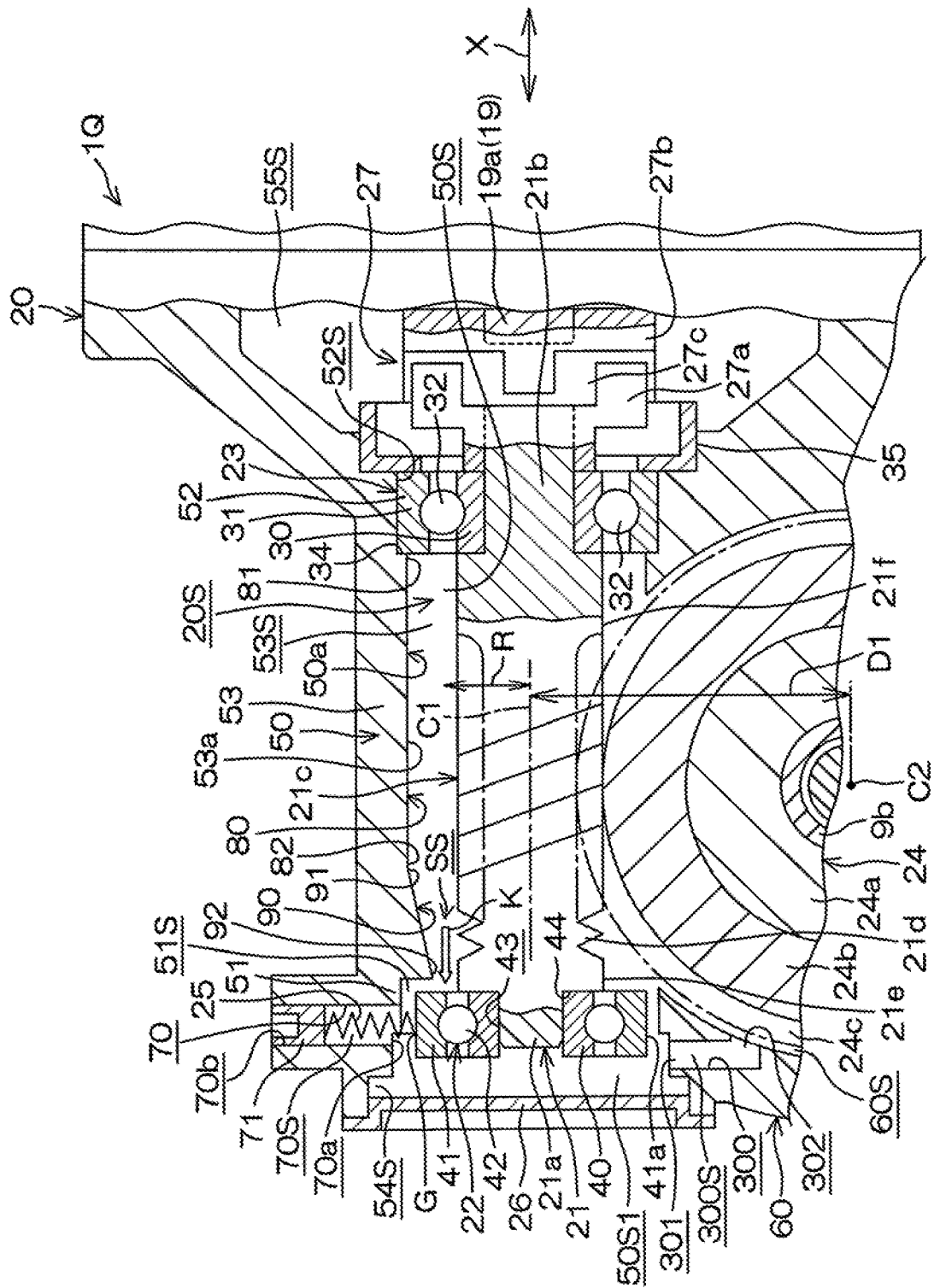
FIG. 4 is a schematic sectional view of a worm reducer according to a third embodiment of the present invention.

When the lubricant is supplied under pressure to fill the internal space 20S of the housing 20 during assembling work for the worm reducer 1P, there is an advantage in that the lubricant is easily supplied to the abutment portion G owing to the actions of both the reduced diameter portions 100 and 200. Although illustration is omitted, the entire first reduced diameter portion 100 may be arranged on the outer side in the radial direction R with respect to the tooth flank forming portion 21d, and the entire second reduced diameter portion 200 may be arranged on the outer side in the radial direction R with respect to the non-tooth flank forming portion 21e. A part of the first reduced diameter portion 100 may be arranged on the outer side in the radial direction R with respect to the tooth flank forming portion 21d, and the remaining part of the first reduced diameter portion 100 and the entire second reduced diameter portion 200 may be arranged on the outer side in the radial direction R with respect to the non-tooth flank forming portion 21e. FIG. 4 is a schematic sectional view of a worm reducer 1Q according to a third embodiment of the present invention. The worm reducer 1Q of the third embodiment in FIG. 4 is different from the worm reducer 1 of the first embodiment in FIG. 2 in that a communication hole 300 is formed in the housing 20. The communication hole 300 communicates a space portion 50S1 of the shaft housing space 50S with the wheel housing space 60S. The space portion 50S1 is arranged opposite to the tooth flank forming portion 21d across the first end 21a. The space portion 50S1 of the shaft housing space 50S is formed so as to include a part of at least one of the first opening 54S and the first bearing housing space 51S.

The communication hole 300 includes a shaft-side opening 301 and a wheel-side opening 302. The shaft-side opening 301 faces the space portion 50S1 of the shaft housing space 50S. The wheel-side opening 302 faces the wheel housing space 60S. An internal space 300S of the communication hole 300 communicates with the space portion 50S1 of the shaft housing space 50S via the shaft-side opening 301. The internal space 300S of the communication hole 300 also communicates with the wheel housing space 60S via the wheel-side opening 302. The wheel-side opening 302 faces the outer periphery of the worm wheel 24 (outer periphery of the tooth flank forming portion 24c).

In this embodiment, along with the rotation of the worm shaft 21 in a predetermined direction, the lubricant in the intermediate part housing space 53S is supplied to the urging member 25 and the outer peripheral surface of the first bearing 22 (outer peripheral surface 41a of the outer ring 41) owing to the action of the reduced diameter portion 90 of the shaft housing portion 50 as in the first embodiment. Moreover, along with the rotation of the worm wheel 24 in a predetermined direction, the lubricant in the wheel housing space 60S is sent to the space portion 50S1 of the shaft housing space 50S and supplied to the abutment portion G via the communication hole 300. Thus, the occurrence of wear and the generation of rubbing noise are further reduced at the abutment portion G.

The wheel-side opening 302 of the communication hole 300 faces the outer periphery of the worm wheel 24 (outer periphery of the tooth flank forming portion 24c). Therefore, along with the rotation of the worm wheel 24 in a predetermined direction, the lubricant is efficiently supplied toward the abutment portion G via the communication hole 300. When the lubricant is supplied under pressure to fill the internal space 20S of the housing 20 during assembling work for the worm reducer 1Q, the lubricant is supplied to the abutment portion G not only from the intermediate part housing space 53S but also from the wheel housing space 60S via the communication hole 300. Thus, there is an advantage in that the lubricant is easily supplied to the abutment portion G.

The present invention is not limited to the embodiments described above. The communication hole 300 of the third embodiment in FIG. 4 may be applied to the worm reducer 1P of the second embodiment in FIG. 3. The reduced diameter portion may have a diameter that is reduced continuously or a diameter that is reduced stepwise in one or a plurality of levels. Various other modifications may be made to the present invention within the scope of claims.

What is claimed is:

1. A worm reducer comprising:
   a worm shaft;
   a worm wheel that meshes with the worm shaft;
   a housing including:
      a tubular shaft housing portion that houses the worm shaft; and
      a wheel housing portion that houses the worm wheel;
   a bearing that rotatably supports one end of the worm shaft;
   an urging member that abuts against an outer peripheral surface of the bearing and urges the worm shaft toward the worm wheel via the bearing; and
   a lubricant housed in an internal space of the housing, wherein
   the worm shaft includes:
      a tooth flank forming portion where a tooth flank is formed; and
      a non-tooth flank forming portion formed between the one end and the tooth flank forming portion, and
   the shaft housing portion includes:
      a substantially straight portion having a substantially constant bore diameter and extending in an axial direction of the worm shaft, the substantially straight portion being axially aligned with and facing teeth of the tooth flank forming portion; and
      a reduced diameter portion including one end connected to one end of the substantially straight portion, the one end of the reduced diameter portion arranged radially outward of the tooth flank forming portion, the reduced diameter portion having a bore diameter reduced from a position that overlaps the tooth flank in the axial direction of the worm shaft to a position that overlaps the non-tooth flank forming portion in the axial direction of the worm shaft.

2. The worm reducer according to claim 1, wherein the reduced diameter portion has a tapered shape.

3. The worm reducer according to claim 1, wherein the bore diameter of the reduced diameter portion is smaller than the bore diameter of the substantially straight portion.

4. The worm reducer according to claim 1, wherein the housing has a communication hole that communicates a space portion of a shaft housing space that is an internal space of the shaft housing portion with a wheel housing space that is an internal space of the wheel housing portion, the space portion being arranged opposite to the tooth flank forming portion across the one end.

5. The worm reducer according to claim 4, wherein the communication hole includes an opening that faces an outer periphery of the worm wheel.

* * * * *